Dec. 23, 1969        H. FRISHOF        3,485,515

DRAGLINE COUPLING

Filed Jan. 30, 1968

INVENTOR.

BY *Henry Frishof*

GREEN, McCALLISTER
AND MILLER

United States Patent Office 3,485,515
Patented Dec. 23, 1969

3,485,515
DRAGLINE COUPLING
Henry Frishof, Du Bois, Pa., assignor to McDowell
Manufacturing Company, Du Bois, Pa., a corporation of Pennsylvania
Filed Jan. 30, 1968, Ser. No. 701,579
Int. Cl. F16l 55/00, 17/00, 33/16
U.S. Cl. 285—5                 5 Claims

ABSTRACT OF THE DISCLOSURE

A fluid coupling is provided whose housing body has a two-part or split-sleeve clamping lock type of assembly at each of its opposite ends for removably-securing adjacent open end portions of a pair of tubing or thin-wall pipe members therewithin. A lower sleeve part of each assembly is integrally secured, as by welding, to provide an endwise extension of the housing body. An opposite, upper, cooperating, removable sleeve part of each assembly is shown secured only by cooperating clamping feet or end flanges and nut and bolt assemblies to the lower sleeve part, on and about an open end portion of an associated pipe member. Cooperating peripheral interlatching tongue and groove portions enable the upper and lower sleeve parts of each assembly to be accurately aligned with each other and to positively retain an associated pipe member against endwise or axial movement out of the housing body when a coupled pipeline is being dragged endwise from one location to another. The lower sleeve part of each assembly serves as an anchor to which the upper sleeve part is removably secured. The housing body carries fluid-sensitive V-shaped gaskets for sealing-off the joints between it and the pipe members, and a sled-like skid is secured to extend longitudinally along the bottom portions of the housing body and the lower sleeve parts.

---

Figure 1:
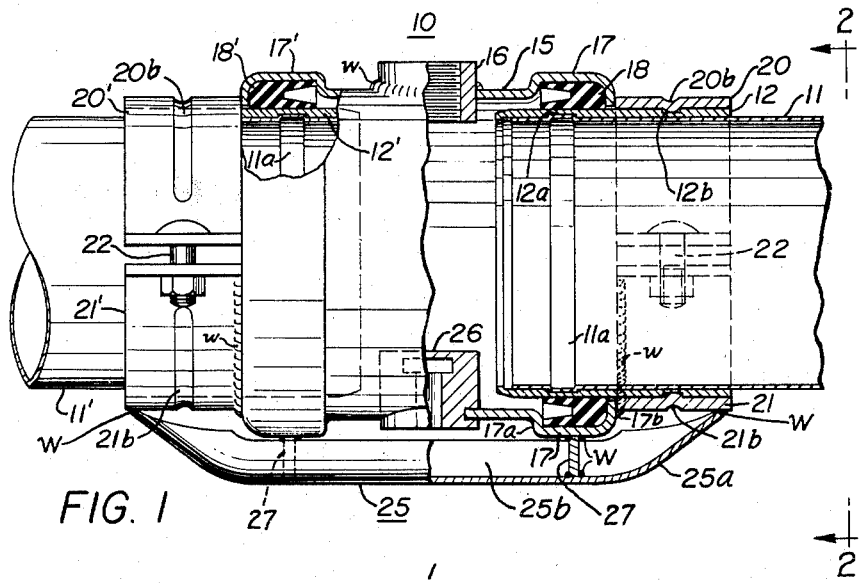

This invention relates to an improved heavy duty coupling suitable for dragline usage and particularly, to a strong, quickly assembled and disassembled, foolproof coupling for securely connecting adjacent open end portions of lengths of fluid carrying pipe or tubing members. An important phase of the invention deals with a coupling for rough outdoor usage that may be accurately brought into an assembled relation with a pair of pipe members that are to be connected, that will retain the assembled relation while permitting relative rotation between the pipe members and the housing body, and that may thereafter secure the pipe members against relative rotation.

The device of the invention was developed based on the need for a strong and foolproof coupling joint for retaining a pair of fluid carrying pipe members in a connected operating relation, as in an irrigating system whose members are to be dragged over the ground, through mud and over obstructions. Such a coupling should be constructed in such a manner as to permit the quick removal or replacement of one or both of a pair of connected pipe members, that will enable the use of either heavy or thin wall pipe members, that will permit the pipe members to be turned or rotatable with respect to each other and thus with respect to the coupling without disconnecting them with respect to each other, and that will have movement facilitating skid means that will protect the coupling and gasket sealing joint portions from mud and other contaminates.

It has thus been an object of the invention to devise a coupling which will be particularly suitable for the rough usage of drag line operations and, at the same time, will provide an effective fluid seal between open end portions of a pair of pipe members.

Another object of the invention has been to provide a drag line coupling that will form an effective support for pipe members being joined and that will have a housing body reinforced at its pipe receiving ends by an extending collar or sleeve part.

Another object of the invention has been to devise a coupling which will make effective and efficient use of an end-positioned, split, clamping lock assembly for guidably receiving and interlatching with a pipe member or its associated nose sleeve.

A further object of the invention has been to provide a split-sleeve or collar type of locking assembly for a fluid coupling which will have one sleeve or collar part secured as a reinforcing and extension, and the other part as a cooperating, interatching and removable clamping means therewith.

A still further object has been to devise a dragline coupling which will positively prevent an open mouth portion of a coupled pipe member from being endwise-removed or slid-out during a dragging operation and, at the same time, which will be adaptable for permitting turning movement of the member with respect to the coupling housing body and when desired, a removal of the pipe member from its coupled relation therewith.

These and other objects of the invention will be apparent to those skilled in the art from the illustrated embodiment and the claims.

Figure 2:
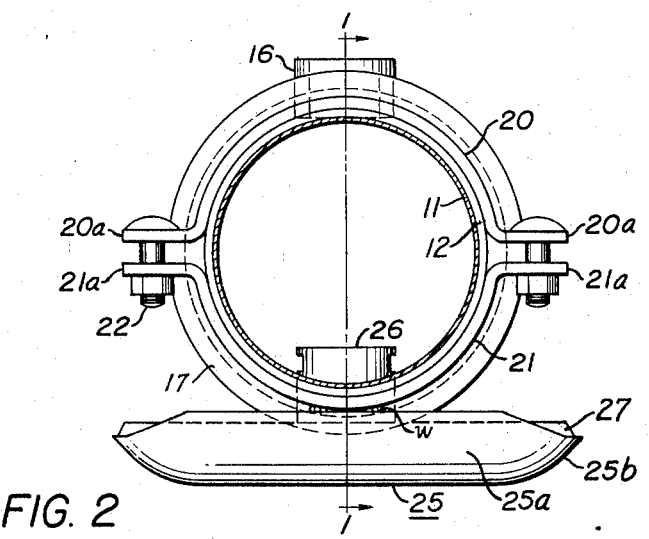
Figure 3:
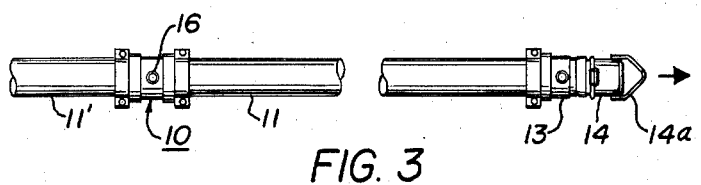

In the drawings, FIGURE 1 is a side view in elevation and partial section illustrating a coupling constructed in accordance with the invention in which a pair of open or mouth end portions of pipe members have been secured; the sectioned portion of this figure is taken along the line 1—1 of FIGURE 2;

FIGURE 2 is an end view in elevation of the construction of FIGURE 1, taken along the line 2—2 of and on the same scale as FIGURE 1;

And FIGURE 3 is a greatly reduced fragmental top plan view illustrating a dragline assembly utilizing a coupling constructed in accordance with the invention.

Referring particularly to FIGURES 1 and 2, dragline coupling 10 is shown as connecting a pair of thin wall tubing or pipe members 11 or 11' together in a fluid-sealed-off relation with respect to each other. It will be noted that the open end portion of pipe member 11 or 11' is shown reinforced by a thickened sleeve or nose part 12 or 12'. Each nose part 12 and 12' is secured by cooperating tongue and groove portions 11a and 12a which, as illustrated in FIGURE 1, involve an annular, out-expanded, tongue-like peripheral joint 11a and a complementary, inwardly-open, annular banding recess 12a. Although each pipe member 11 and 11' is secured in tight frictional engagement within its associated nose part 12 and 12', the interlatching tongue and groove portions 11a and 12a assure that the two cannot be separated by endwise force or movement.

The coupling shown has a central or intermediate substantially cylindrical body part 15, an internally-threaded, upwardly-extending, outlet fitting 16 for a conventional overhead water spray device, a drain valve 26, and a pair of outwardly-expanded or projecting annular, identical, open-mouth portions 17 and 17' at its opposite ends. As shown in FIGURE 1, open mouth portion 17 has a connecting shoulder 17a with the central body part 15 and an in-turned, front flange portion 17b which serves to retain a resilient annular gasket 18 in an operating position therein. The gasket 18' is identical in construction and operation with the gasket 18. As shown, the gaskets 18 and 18' have a V-shaped end portion to provide a fluid pressure-sensitive chamber and opposed sealing lips in engagement with the inner periphery of the associated mouth portion 17 or 17' and outer periphery of pipe member 11 or 11'.

Each end of the housing body of the coupling 10 is shown provided with a split sleeve or collar clamping lock assembly made up of an upper, semi-circular sleeve or collar part 20 or 20' and a lower, semi-circular, sleeve or collar part 21 or 21'. The lower part 21 or 21' is shown endwise-secured, as by weld metal w to extend from the front flange 17b of the open mouth portion 17 or 17' to provide an endwise-extension of the housing body, positioned about a lower side of the periphery of the associated pipe member 11 or 11'. The upper sleeve part 20 and 20' of each clamping assembly is of similar construction but is removable. Both the parts 20 and 21 have interlatching, inwardly-projecting, annular, peripheral, tongue portions 20b and 21b that are adapted to engage in a complementary manner within a peripheral recess or groove portion 12b of an associated nose part 12. This assures that the pipe member 11 or 11' is always accurately aligned within the coupling and that the upper sleeve part 20 or 20' is properly aligned, not only with the associated pipe member that is being coupled, but also with the lower clamping part 21 or 21'.

The upper and lower clamping parts 20 or 20' and 21 or 21' have end flanges or feet portions 20a and 21a that project outwardly on the same plane and that are provided with aligned openings therethrough to receive nut and bolt assemblies 22. The assemblies 22, when tightened-down, secured each pipe member 11 or 11' to the coupling 10 in a substantially rigid latching and endwise-movement-resisting manner. The pipe member 11 or 11', however, can be rotated or turned by loosening the bolt and nut assemblies 22, without spoiling the joined or coupled relation with respect to the coupling device 10. This is true since the cooperating latching engagement between the tongue and groove portions of each locking assembly and its associated pipe member 11 or 11' is retained until the upper sleeve part 20 or 20' is in a very loose relation with respect to the lower part 21 or 21'. The use of secured or unitary lower parts 21 and 21' and of removable upper parts 20 and 20' not only facilitates a pivotal and guided insertion and removal of the pipe members 11 and 11' with respect to the housing body 15, but also assures an endwise-reinforced mounting for the pipe members.

To protect the coupling 10 and provide a smooth guided movement and point of support for movement of a system or length of pipe members, a sled-like skid 25 is provided. The skid 25 is of scoop-like or sled shape having a pair of opposed, spaced-apart, upright front and back end walls 25a that slope upwardly and outwardly, and a pair of opposed, spaced-apart, upright side walls 25b that also slope upwardly and outwardly. The connected relationship of the end and side walls thus provides a somewhat hollow construction for the skid 25. Support is provided by extending the end walls 25a endwise or longitudinally along the bottom of both sleeve parts 21 and 21'. The skid 25 has a full length extension beneath and along the bottom portion of the housing body of the coupling 10 and substantially fully along the bottom portions of the sleeve parts 21 and 21'. The edge portions of the end walls 25a may be secured, as by weld metal w to the sleeve parts 21 or 21'. As shown particularly in FIGURE 1 of the drawings, the open mouth portion 17 of outwardly-projecting annular shape is adapted to receive and carry annular gasket 18, and is secured as by weld metal w to a cross-extending associated one of a pair of spaced-apart upright rib walls 27 of the skid 25. Since the other rib wall 27 is secured to identical mouth portion 17' at the other end of the body of the coupling 10 and since, as previously pointed out, the edge portions of the end walls 25 are secured by weld metal to the lower sleeve parts 21 and 21', both ends of the skid 25 have a secure and reinforced mounting along the bottom or underside of the assembly.

In FIGURE 3, coupling 10 of the illustrated construction is shown connected in a pipeline system. At one end, the pipe member 11' may be connected by a suitable coupling to a fluid supply feeder line and at its other end through a series of lengths of pipe members and of couplings, such as 10, to an end coupling 13 having a nose part 14 and a yoke 14a. The yoke 14a is adapted to receive the hook of a dragline such as from a tractor, in order that an entire length of pipe members which may include a number of couplings 10 may be dragged from one location to another along the ground, after one pipe member 11' has been disconnected, for example, at its forward or upstream end from the feeder or water supply line.

What I claim:

1. In a dragline coupling for connecting a pair of pipe members with their open end portions in an aligned relation with each other, wherein the coupling has a housing body provided with an open end portion at one end to receive the open end portion of one pipe member and with an open mouth portion at its other end to receive the open end portion of the other pipe member, the improvement which comprises: a pair of split clamps, one of said clamps having a lower sleeve part secured at one end to a lower periphery of one open mouth portion of the housing body to project forwardly thereof and to removably-receive and fit over a lower outer side of the open end portion of the one pipe member, the other of said clamps having a lower sleeve part secured at one end to a lower periphery of the other open mouth portion of the housing body to project forwardly thereof and to removably-receive and fit over a lower outer side of the open mouth portion of the other pipe member, each of said clamps having a removable upper sleeve part cooperating with said lower sleeve part, said upper and lower sleeve parts of each clamp having cooperating flange end portions, each of said clamps and its associated pipe member having cooperating interengaging means for aligning said upper and lower sleeve parts and the pipe member with respect to each other; means engaging said cooperating flange end portions for securing each said clamp about its respective pipe member to, when loosened, cooperate with said interengaging means to retain the associated pipe member with respect to the housing body while permitting relative rotation therebetween and, when tightened-down, to positively retain the associated pipe member against movement with respect to the housing body; a pair of resilient annular fluid-pressure-sensitive gaskets, one of said gaskets being carried within the one open mouth portion to seal-off the joint between its associated pipe member and the housing body and the other of said gaskets being carried within the other open mouth portion to seal-off the joint between its associated pipe member and the housing body, and a skid secured to and along an underside of the housing body to extend endwise thereof.

2. In a dragline coupling as defined in claim 1, said cooperating interengaging means comprising tongue and groove portions extending along an inner periphery of said pair of clamps substantially centrally thereof and about an outer periphery of the associated pipe members.

3. In a dragline coupling as defined in claim 1, said skid having a spaced-part pair of upright end closure walls and a pair of spaced-apart side closure walls, and a pair of cross-extending and spaced-apart upright rib walls on said skid weld-secured to the housing body.

4. In a dragline coupling as defined in claim 3, means weld-securing said end closure walls to said lower sleeve parts of said pair of clamps.

5. In a dragline coupling as defined in claim 4, said skid having a substantially planar bottom plate member, and said end and side closure walls being upwardly-outwardly sloped from said planar bottom wall.

References Cited

UNITED STATES PATENTS

| | | | |
|---|---|---|---|
| 530,917 | 12/1894 | Ames | 285—417 |
| 2,469,538 | 5/1949 | Young | 285—5 |
| 2,702,717 | 2/1955 | Cornelius | 285—5 X |
| 2,923,308 | 2/1960 | Shohan | 285—369 X |
| 3,068,025 | 12/1962 | Stilwell | 285—5 |

FOREIGN PATENTS

| | | |
|---|---|---|
| 223,262 | 8/1959 | Australia. |
| 858,368 | 1/1961 | Great Britain. |

DAVID J. WILLIAMOWSKY, Primary Examiner

D. W. AROLA, Assistant Examiner

U.S. Cl. X.R.

285—111, 286, 420